United States Patent
Wlasowski (10) Patent No.: US 10,196,909 B2
(45) Date of Patent: Feb. 5, 2019

(54) METHOD FOR PRODUCING AN INTEGRAL BENT HOUSING FOR AN AXIAL TURBOMACHINE COMPRESSOR

(71) Applicant: Techspace Aero S.A., Herstal (BE)

(72) Inventor: Michel Wlasowski, Verviers (BE)

(73) Assignee: SAFRAN AERO BOOSTERS SA, Herstal (BE)

( * ) Notice: Subject to any disclaimer, the term of this patent is extended or adjusted under 35 U.S.C. 154(b) by 705 days.

(21) Appl. No.: 14/693,593

(22) Filed: Apr. 22, 2015

(65) Prior Publication Data
US 2015/0308278 A1 Oct. 29, 2015

(30) Foreign Application Priority Data

Apr. 24, 2014 (EP) ..................................... 14165796

(51) Int. Cl.
*B23K 20/12* (2006.01)
*F01D 9/04* (2006.01)
(Continued)

(52) U.S. Cl.
CPC .......... *F01D 9/044* (2013.01); *B23K 20/1205* (2013.01); *B23K 20/129* (2013.01); *B23K 20/227* (2013.01); *B23K 20/233* (2013.01); *B23K 20/2333* (2013.01); *B23K 2101/001* (2018.08); *B23K 2103/04* (2018.08); *B23K 2103/10* (2018.08); *B23K 2103/14* (2018.08);
(Continued)

(58) Field of Classification Search
CPC ............... Y10T 29/49323; F01D 9/044; F05D 2230/53; F05D 2230/239
See application file for complete search history.

(56) References Cited

U.S. PATENT DOCUMENTS 2,254,674 A * 9/1941 Christman ............ B24B 39/045
29/90.01
2,945,290 A * 7/1960 Walsh ...................... F01D 9/042
29/889.22
(Continued)

FOREIGN PATENT DOCUMENTS

EP 1227218 A2 7/2002
EP 1310633 A1 5/2003

OTHER PUBLICATIONS

Search Report dated Jun. 11, 2014 from European Patent Appl. No. 14165796.5.

*Primary Examiner* — Sarang Afzali
*Assistant Examiner* — Ruth G Hidalgo-Hernandez
(74) *Attorney, Agent, or Firm* — James E. Walton (57) ABSTRACT

The present application relates to a method for producing a housing for an axial turbomachine compressor having a metal sheet with annular rows of stator blades which are welded to the metal sheet. The method includes the steps of: (a) providing or producing a planar metal sheet with a step of machining in order to form blade stumps; (b) welding stator blades of friction to one of the planar faces of the metal sheet, the blades being arranged so as to form parallel straight rows of blades; (c) bending the metal sheet about a bending axis perpendicular to each row of blades, so as to form a half-tube with annular half-rows of blades which are axially spaced apart, and producing annular grooves by rolling; (d) welding annular flanges and axial flanges; (e) application of annular layers of abradable material.

12 Claims, 5 Drawing Sheets

(51) Int. Cl.
*B23K 20/227* (2006.01)
*B23K 20/233* (2006.01)
B23P 15/00 (2006.01)
B23K 101/00 (2006.01)
B23K 103/04 (2006.01)
B23K 103/10 (2006.01)
B23K 103/14 (2006.01)

(52) U.S. Cl.
CPC ...... *B23P 15/006* (2013.01); *F05D 2230/239* (2013.01); *F05D 2230/53* (2013.01); *Y10T 29/49323* (2015.01)

(56) References Cited

U.S. PATENT DOCUMENTS

| | | | | |
|---|---|---|---|---|
| 3,072,380 | A * | 1/1963 | Hennig | F01D 9/042 |
| | | | | 415/136 |
| 6,106,233 | A * | 8/2000 | Walker | B23K 20/1205 |
| | | | | 228/112.1 |
| 6,321,448 | B1 | 11/2001 | Makino | |
| 6,415,510 | B2 * | 7/2002 | Mertens | B64C 3/00 |
| | | | | 244/117 R |
| 7,165,934 | B2 * | 1/2007 | Reigl | F01D 25/24 |
| | | | | 415/108 |
| 2009/0266135 | A1 * | 10/2009 | Knaup | B21D 22/02 |
| | | | | 72/377 |
| 2011/0299977 | A1 * | 12/2011 | Memmer | F01D 11/122 |
| | | | | 415/173.4 |

* cited by examiner

METHOD FOR PRODUCING AN INTEGRAL BENT HOUSING FOR AN AXIAL TURBOMACHINE COMPRESSOR

This application claims priority under 35 U.S.C. § 119 to European Patent Application No. 14165769.5, filed 24 Apr. 2014, titled "Integral Bent Housing for an Axial Turbomachine Compressor," which is incorporated herein by reference for all purposes.

BACKGROUND

1. Field of the Application

The present application relates to a method for producing an axial turbomachine housing. More specifically, the present application relates to an integral housing comprising blades. The present application also relates to an axial turbomachine which comprises a housing produced according to the present application.

2. Description of Related Art

An axial turbomachine generally comprises a plurality of structural housings which allow different modules to be supported. The housings further allow the annular flows which pass through the turbomachine to be guided and delimited. In order to redirect the annular flows, the turbomachine comprises a plurality of annular rows of blades which are connected to the housings.

Stator blades which are arranged in an annular row may be directly welded to a wall of the turbomachine. This method of fixing allows a robust integral assembly to be constituted. This architecture further allows the number of interfaces between the mechanical elements to be reduced.

Document U.S. Pat. No. 6,321,448 B1 discloses a method for producing an external housing of a turbomachine. The method comprises the succession of several steps, including the cutting of a metal sheet so as to give it the dimensions which correspond to the outer sides of the housing, bending of the cut metal sheet in order to form a tube, laser cutting of the metal sheet in order to create openings in accordance with the profiles of the blades, then inserting and welding the blades in their openings in order to fix them in a definitive manner. This method allows the time to be reduced for positioning and adjusting the blades in the tube which forms the housing. However, this method requires that precise cuts be carried out whose presence embrittles the housing. The operation for welding the blades is also laborious since it can be carried only from the outer side. The use of laser welding extends the production time and increases the assembly time. The combination of the method of cutting, welding and bending impairs in particular the fatigue resistance of the material of the metal sheet at the junction with each blade.

Although great strides have been made in the area of axial turbomachine housings, many shortcomings remain.

DETAILED DESCRIPTION OF THE PREFERRED EMBODIMENT

The present application aims to resolve at least one of the problems presented by the prior art. More specifically, an object of the present application is also to reduce the production time for an integral turbomachine housing with an annular row of welded blades. An object of the present application is also to preserve and/or increase the mechanical strength of an integral housing comprising an annular row of welded blades.

The present application relates to a method for producing a housing for an axial turbomachine, in particular for a compressor, the housing comprising a metal sheet and at least one annular row of stator blades, the method comprising the following steps: (a) providing or producing a planar metal sheet; (b) welding stator blades to one of the planar faces of the metal sheet, the blades being arranged so as to form at least one row of blades; remarkable in that it then comprises a step of (c) bending the metal sheet about a bending axis perpendicular to the row of blades, so as to form a housing with at least one angular tube portion as a result of the metal sheet, and with at least one angular portion of an annular row of blades.

According to an advantageous embodiment of the present application, during step (b) welding the blades, the blades are welded by means of friction, optionally in accordance with a movement in the plane of the planar metal sheet.

According to an advantageous embodiment of the present application, following step (c) bending the metal sheet, the metal sheet forms a tube with at least one annular row of blades, or the metal sheet forms an angular tube portion, such as a half-tube with at least one annular half-row of blades, optionally the bent metal sheet has a concave surface and a convex surface, each row of blades being located on the concave surface.

According to an advantageous embodiment of the present application, during step (b) welding the blades, at least one or each blade is welded over the entire aerodynamic profile thereof at the junction thereof with the metal sheet.

According to an advantageous embodiment of the present application, during step (b) welding the blades, the blades of each row have parallel chords, the chords of the blades being inclined through an angle less than 30°, preferably less than 20°, relative to the bending axis of the metal sheet of step (c) bending the metal sheet.

According to an advantageous embodiment of the present application, step (a) providing or producing a metal sheet comprises a step of machining a rough plate so as to form a metal sheet with variations of thickness.

According to an advantageous embodiment of the present application, the machining step comprises the production of stumps of blades to which the blades are welded, the general thickness of the metal sheet being less than or equal to the height of the stumps, the thickness of each stump being greater than the thickness of the corresponding blade.

According to an advantageous embodiment of the present application, the housing is formed from two half-housings which are separated axially along an axial separation plane.

According to an advantageous embodiment of the present application, the method further comprises a step (d) of welding annular flanges which extend radially and/or axial flanges which extend radially, optionally the axial flanges are produced by means of folding.

According to an advantageous embodiment of the present application, during step (c) bending, the bending may comprise at least one, preferably a plurality of, step(s) of rolling and/or roller burnishing.

According to an advantageous embodiment of the present application, the bending is carried out with rollers which abut the metal sheet at the side of the blades at one side and the other of each annular row of blades, preferably the metal sheet comprises a plurality of rows of blades and the rollers at the side of the blades are in abutment between each row of blades.

According to an advantageous embodiment of the present application, the bending is carried out using rollers which are arranged at one side and the other of the metal sheet, the rollers which are located at one side of the metal sheet being axially spaced apart relative to the rollers which are located at the other side of the metal sheet, optionally the rollers which are located at one side of the metal sheet radially overlap the rollers which are located at the other side of the metal sheet so as to form internal annular grooves between the annular rows of blades.

According to an advantageous embodiment of the present application, at least one annular groove has a depth which is greater than the general thickness E1 of the metal sheet.

According to an advantageous embodiment of the present application, the method further comprises a step (e) of application of at least one annular layer of abradable material, optionally in an annular groove.

According to an advantageous embodiment of the present application, the blades each have a main stacking direction, following the welding operation of the blades, the main stacking directions are parallel, and, following the bending step, the main stacking directions are regularly inclined relative to each other; they are optionally concentric.

According to an advantageous embodiment of the present application, each row of blades or all the rows of blades is/are parallel with the same edge of the planar metal sheet.

According to an advantageous embodiment of the present application, the stumps form blocks of material.

According to an advantageous embodiment of the present application, during the step (b) welding the blades, each row is perpendicular to the axis about which the metal sheet is bent.

According to an advantageous embodiment of the present application, during step (c) bending the metal sheet, the bending involves wrapping the blades inside the metal sheet.

According to an advantageous embodiment of the present application, the leading edges and the trailing edges of the blades are generally perpendicular to the general plane of the metal sheet.

According to an advantageous embodiment of the present application, the housing is generally tubular, and during step (c) bending, the metal sheet is bent about the axis of the tube.

According to an advantageous embodiment of the present application, during step (c) bending, the metal sheet is bent in accordance with the height of the blades, optionally the metal sheet is curved inwards in the direction of the height of the blades and/or in the direction of stacking of the profiles of the blades.

The present application also relates to a turbomachine, i.e., an axial turbomachine comprising a housing having at least one annular row of stator blades, which turbomachine is remarkable in that the housing is produced in accordance with the production method of a housing according to the present application.

The present application enables a robust housing to be produced in a simple manner.

The use of a stump allows the thermally affected zone to be moved away from the metal sheet. In this manner, the metal sheet is not embrittled during the bending operation.

The present application also allows the thickness of the metal sheet to be reduced and therefore enables the housing to be made lighter whilst reducing the deformations in the thickness of the metal sheet. The blades have junctions which are generally axial with the metal sheet, they therefore allow rows of reinforcement members to be formed. These rows supplement the strengthening action of the flanges which surround the metal sheet.

During the welding step, the metal sheet and the blades become heated then cool, allowing stresses to appear. When these are traction stresses, the formation of the grooves may allow a compression stress to be formed in the material, which improves the durability. This effect can be achieved as a result of the geometric deformation of the metal sheet and/or as a result of the roller burnishing. The production of cracks may also be combated.

In the following description, the terms inner or internal and outer or external refer to a positioning relative to the rotation axis of an axial turbomachine.

Figure 1:
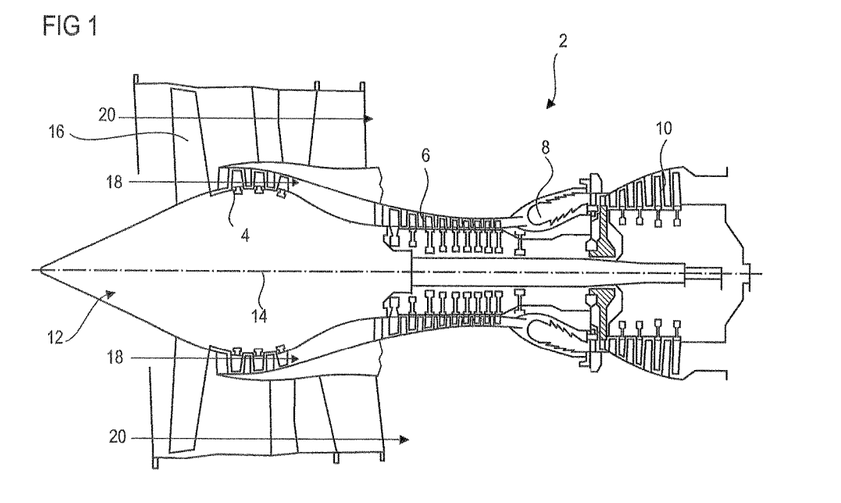
FIG. 1 shows an axial turbomachine according to the present application.

FIG. 1 shows an axial turbomachine in a simplified manner. In this precise case, it is a dual-flow turboreactor. The turboreactor 2 comprises a first compression level, referred to as the low pressure compressor 4, a second compression level, referred to as the high-pressure compressor 6, a combustion chamber 8 and one or more turbine levels 10. During operation, the mechanical power of the turbine 10 transmitted via the central shaft to the rotor 12 moves the two compressors 4 and 6. Reduction means may increase the rotation speed transmitted to the compressors. Alternatively, the different turbine stages may each also be connected to the compressor stages via concentric shafts. These comprise several rows of rotor shafts which are associated with rows of stator blades. The rotation of the rotor about the rotation axis 14 thereof thus enables a flow of air to be generated and allows it to be progressively compressed as far as the inlet of the combustion chamber 10.

An inlet ventilator which is generally referred to as a fan or blower 16 is coupled to the rotor 12 and generates a flow of air which is divided into a primary flow 18 which passes through the different levels of the turbomachine mentioned above and a secondary flow 20 which passes through an annular conduit (partially illustrated) along the machine in order to then rejoin the primary flow at the output of the turbine. The secondary flow may be accelerated so as to generate a reaction. The primary flow 18 and secondary flow 20 are annular flows and they are channelled via the housing of the turbomachine. To this end, the housing has cylindrical walls or shells which may be internal or external.

Figure 2:
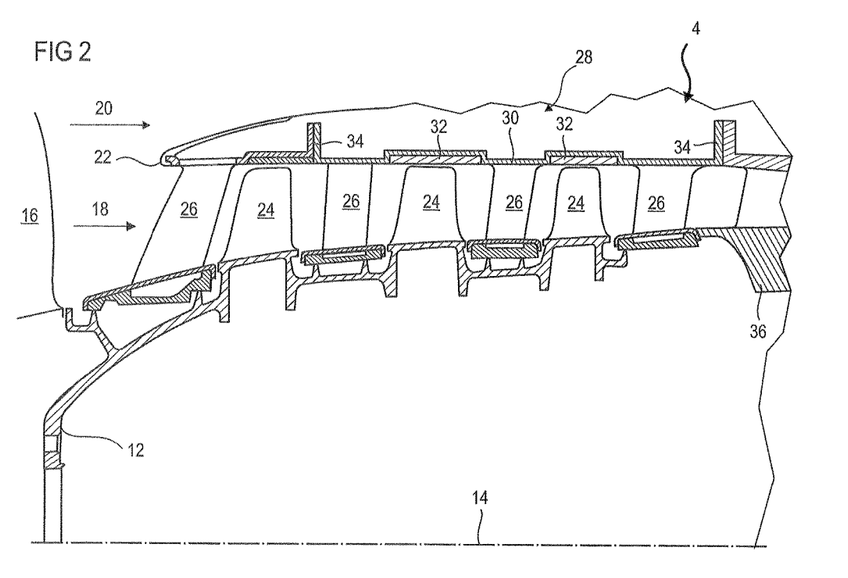
FIG. 2 shows a turbomachine compressor according to the present application.

FIG. 2 is a sectioned view of a compressor of an axial turbomachine 2, such as that of FIG. 1. The compressor may be a low-pressure compressor 4. It is possible to see at this location a portion of the fan 16 and the separation nozzle 22 of the primary flow 18 and the secondary flow 20. The rotor 12 comprises a plurality of rows of rotor blades 24, in this instance three.

The low-pressure compressor 4 comprises a plurality of rectifiers, in this instance four, which each contain a row of stator blades 26. The rectifiers are associated with rows of rotor blades 24 in order to rectify the flow of air, so as to convert the speed of the flow into pressure.

The compressor may comprise a housing 28, for example, an external housing. The housing may form a sealed generally tubular wall 30, it may delimit the primary flow 18 of the turbomachine. The housing 28 may act as a support for the stator blades 26, and optionally for annular layers of abradable material 32. The stator blades 26 extend substantially radially from the housing. They are regularly spaced apart from each other, and have the same angular orientation in the flow. Advantageously, the blades of the same row are identical. The housing may also comprise annular fixing flanges 34 which extend radially. These flanges 34 may allow the separation nozzle 22 to be assembled, or allow the housing to be fixed to the intermediate housing of the turbomachine 36.

Figure 3:
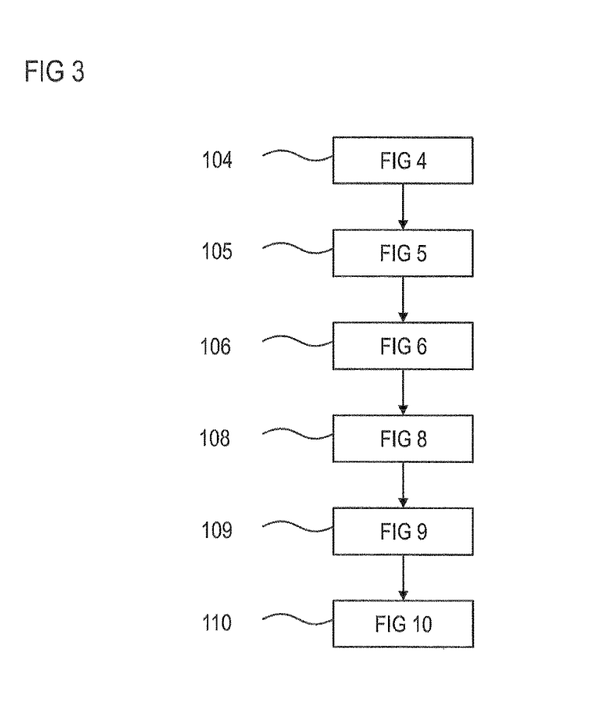
FIG. 3 is a chart of the method for producing an axial turbomachine housing according to the present application.

FIG. 3 is a chart of the method for producing the turbomachine housing according to the present application. The method enables a low-pressure or high-pressure compressor housing, a turbine housing, or a blower housing to be produced.

The method may comprise the succession, optionally in this order, of the following steps:
  providing and/or producing 104 a metal sheet;
  welding 106 blades to the metal sheet;
  bending 108 the metal sheet, for example, in order to form a half-tube;
  welding axial and annular flanges to the bent metal sheet;
  using a layer of abradable material in the bent metal sheet;
  repeating the steps (a) to (e) and fixing axial flanges so as to form a complete annular housing when the housing is produced by means of portions of housings, such as half-housings.

The production portion of step (a) providing or producing 104 is optional. The blades may be directly welded to one of the faces of a provided metal sheet. According to a variant of the present application, the provision of a metal sheet may be the provision of a metal sheet which has blade stumps produced during a machining step 105.

The step (d) of welding flanges 110 is optional. The step (f) is optional. The housing may be produced without flanges. It may be fixed to the turbomachine using any other suitable means. Alternatively, the metal sheet may be folded, for example, in order to form axial flanges. It may also be shaped in order to form annular flanges. The bent metal sheet may be closed by means of welding.

Figure 4:
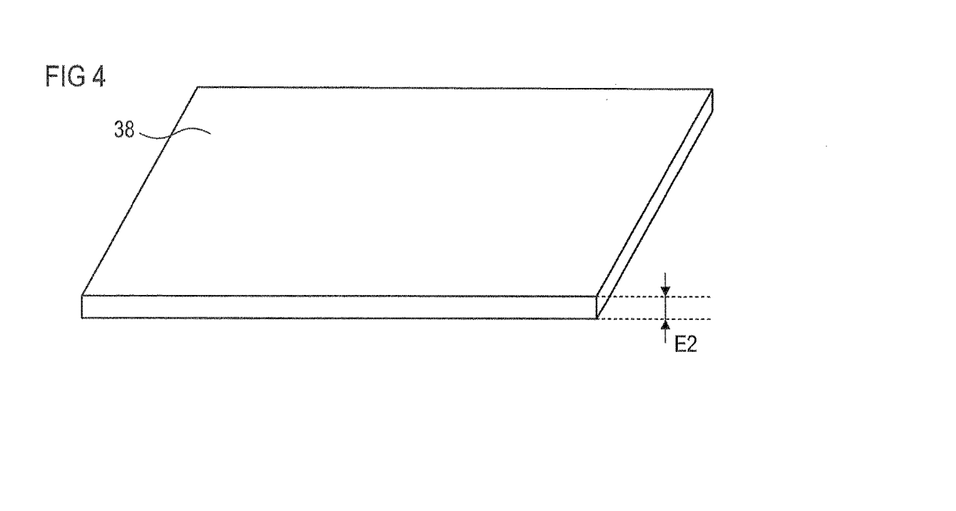
FIG. 4 shows a rough plate which allows a metal sheet according to the present application to be produced.

FIG. 4 illustrates the step of providing or producing 104 a metal sheet which enables the housing to be produced.

The step of providing a metal sheet may comprise the provision of a planar metal sheet which may optionally be rectangular. It may have two opposing main faces; and four sides or edges which are opposed in pairs. The metal sheet may be produced by means of rolling. The metal sheet may be of steel, titanium, aluminium. The thickness thereof may be less than 5 mm, preferably less than 2 mm, optionally less than 1 mm. The thickness and the material thereof are configured in order to produce a tube having a diameter less than 1 m, preferably less than 70 cm, with resilient deformation.

The step of providing or producing may comprise, optionally, the production of the metal sheet. This may be produced from a rough plate 38 of metal which is subjected to production methods, such as material removal operations. The rough plate 38 may generally be rectangular and may have two opposing main faces. These faces are generally planar and parallel. They may define the thickness E2 of the rough plate 38 which is greater than the general thickness of the planar metal sheet.

Figure 5:
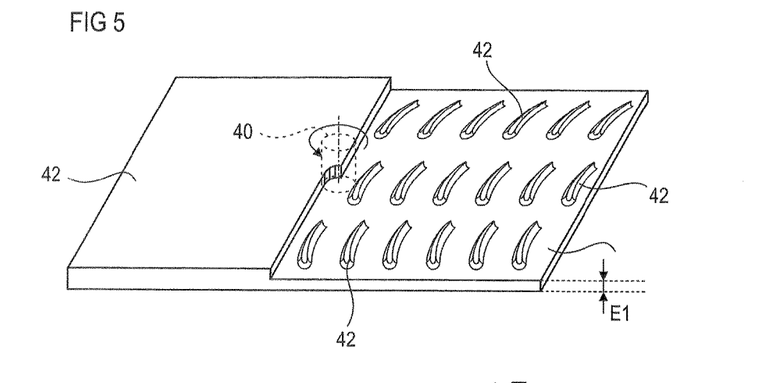
FIG. 5 illustrates the step of machining a rough plate so as to form a metal sheet with blade stumps according to the present application.

FIG. 5 illustrates the production option of the step of provision or producing a metal sheet from a rough plate of metal.

The step of producing a metal sheet may comprise the machining of the rough plate 38. This machining operation may comprise one or more milling operations. One or more milling cutters 40 pass over the extent of the plate in order to locally remove material, in accordance with a plurality of thicknesses. The machining step may enable at least one, preferably a plurality of, form(s) of blade stumps 42 to be produced in the thickness E2 of the rough plate, and portions of lesser thickness to be produced between the stumps 42. The stumps 42 may form protuberances on one of the faces of the metal sheet.

This step leads to the formation of a sheet having stumps 42 whose general thickness E1 corresponds to the thickness of the portions having a smaller thickness. The cumulative thickness of the thickness E1 of the metal sheet added to the height of the stumps 42 may be less than the thickness E2 of the rough sheet 38. The blade stumps 42 may be arranged in at least one row. The stumps 42 of the same row may be identical. The profiles of the stumps 42 may have chords from the leading edge or point to the trailing edge or point. The different rows of stumps may have different chords whose inclinations relative to the rows vary progressively.

Figure 6:
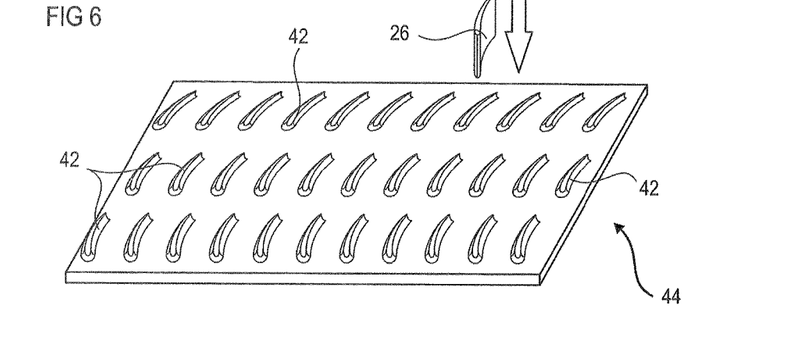
FIG. 6 illustrates the step of welding the blades to the metal sheet according to the present application.

FIG. 6 illustrates the step of fixing the stator blades 26 to the metal sheet 44 provided or produced, the fixing being able to be carried out by means of welding.

The welding may comprise the welding of blades 26 which are fitted, in a complete state or in portions, the portions being, for example, vanes of blades. Machined stumps may comprise portions of blade vanes, in order to move the weld joints away from the metal sheet 44. The welded blades 26 or the welded vanes may each comprise a leading edge and a trailing edge which each form a protruding edge. They may each comprise an inner surface and an outer surface which are optionally for the most part parallel. They may each comprise a stack of aerodynamic profiles which are profiled in order to redirect the flow relative to the axis of the turbomachine. The profile of the blade in contact with the metal sheet may be integrally welded to the metal sheet.

The blades 26 may be directly welded to the metal sheet, for example, on a planar surface which forms one of the faces of the metal sheet. They may also be welded to stumps 42 if the metal sheet 44 is provided with them. The stumps 42 form material blocks, which may be wider in the direction of the rows than the blades 26 which are welded thereto. The heights of the stumps 42 may be greater than the general height or general thickness of the metal sheet 44, the height of the stumps being measured over the thickness of the metal sheet 44. The stumps 42 may have blade feet and may have radii for connection to the metal sheet in order to enable a distribution of forces. The stumps 42 may be thicker than the blades 26, the thickness being able to be the maximum thickness, the thickness being measured transversely relative to the chord of the blade. The solid appearance of the stumps enables the metal sheet 44 to be reinforced and also allows thermal inertia to be produced during the welding operation.

The blades 26 may form, in accordance with their profile, cooling fins which enable the solidification direction of the weld seams to be orientated. The leading edges and trailing edges may substantially be sharp and fine, which accelerates the cooling and the solidification of the weld seams. These may allow the leading edges and the trailing edges of the blades to be solidified towards the centre, optionally generating a stress in the weld seam, for example, as a result of a cooling speed which is different from that of the metal sheet 44.

Advantageously, the blades 26 may be welded by means of friction. This method is advantageous since it requires only a few seconds, optionally from two to five seconds of friction in order to weld a blade. This method is particularly suitable for a metal sheet since it naturally has parallel receiving and support surfaces. These surfaces advantageously remain planar at this stage of the method. The optional existence of the stumps limits the deformation of the metal sheet during and after friction, forming cushions.

Figure 7:
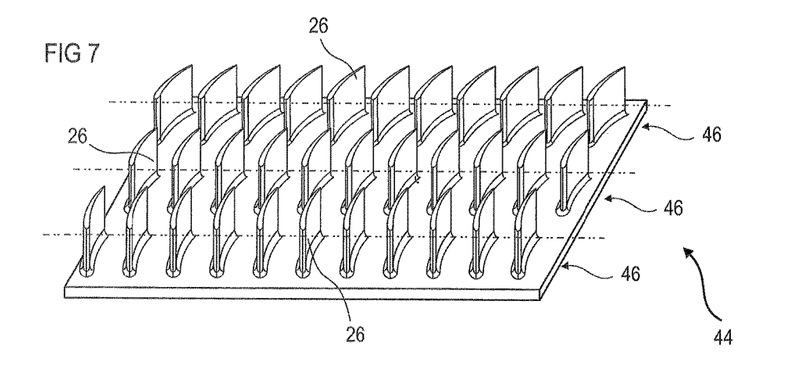
FIG. 7 shows a metal sheet with rows of blades according to the present application.

FIG. 7 shows the planar metal sheet 44 with at least one straight row of blades 26, in this instance the metal sheet 44 supports and connects three rows 46 of aligned blades 26.

The metal sheet supports at least one row 46 of blades 26, preferably a plurality of rows 46 of blades. Each row 46 is straight and optionally parallel with an edge of the perpendicular metal sheet. Preferably, all the rows 46 are parallel with the same edge.

Each row 46 may be defined by its type of blade 26. The blades 26 of the same row may each have the same leading angle, and/or the same height, and/or the same mean thickness. The heights of the blades 26 of the different rows may vary, for example, progressively in a downstream direction. Optionally, in a compressor, the height of the blades may decrease in a downstream direction, whilst they may increase in a downstream direction in the case of a turbine.

Figure 8:
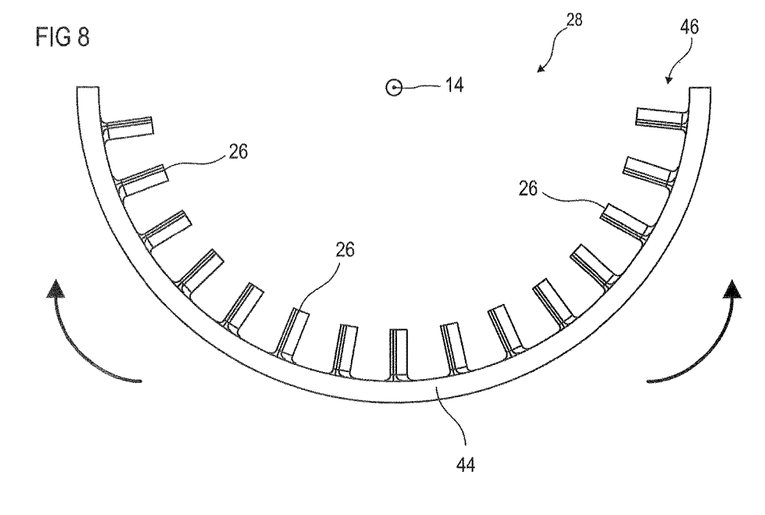
FIG. 8 illustrates the step of bending the metal sheet according to the present application.

FIG. 8 illustrates the step of bending the initially planar metal sheet 44.

The metal sheet 44 is bent. Two of the opposing sides thereof are moved towards each other and are bent. It may be partially wound about an axis in accordance with a radius of curvature, over a fraction of a turn. The radius of curvature may be constant in accordance with the circumference and may vary axially.

The bending may be carried out about a bending axis which is perpendicular to each row of blades. The bending axis may be the axis about which the blade is wound or rotates. That bending axis may be parallel with or may coincide with the rotation axis 14 of the turbomachine. The bending may allow a tube to be formed which forms a complete revolution, or an angular tube portion, such as a half-tube. The blades 26 which are connected thereto form at least one, optionally a plurality of, annular half-rows of blades which are distributed axially along the metal sheet. The method enables half-housings to be produced in a state separated by an axial plane. The term axial plane is intended to be understood to be a plane which extends via the bending axis and/or the rotation axis 14 of the turbomachine. The housing may form a half-tube with annular half-rows of blades which are axially spaced apart.

The sheet 44 may be bent in different manners. It may be bent by means of winding, pushing, rolling or drawing. It is folded, twisted, for example, while holding it at portions and bending it by pressing between the portions. The metal sheet 44 may comprise retention portions which are cut after bending.

Following this step, the housing or the housing portion may comprise an angular portion of an annular row 46 of blades, preferably a plurality of angular portions of annular rows 46 of blades, only one being illustrated. The metal sheet 44 may have a circular or curved axial profile. The axial profile is taken along a plane perpendicular to the bending axis. The metal sheet 44 has a concave inner surface and a convex outer surface where the blades are located.

Figure 9:
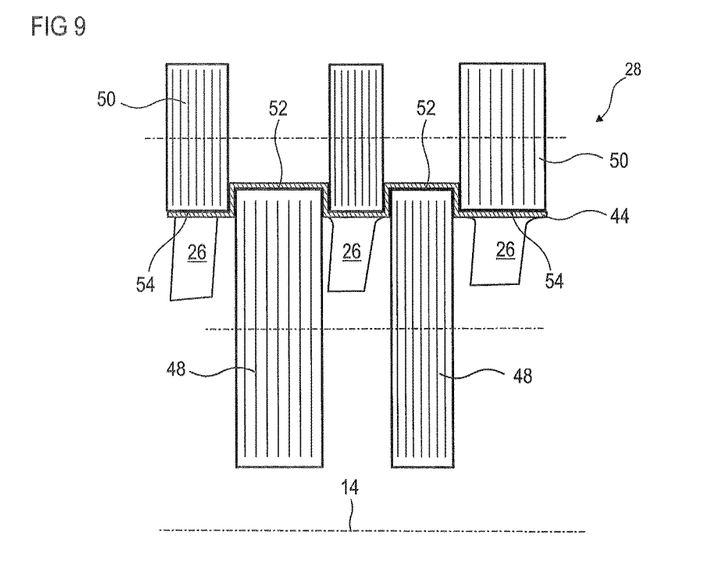
FIG. 9 shows a detail of the step of bending the metal sheet according to the present application.

FIG. 9 illustrates an embodiment of the bending. This embodiment may be produced in addition to another bending method, or allow the metal sheet 44 to be bent as a whole.

The metal sheet 44 may be bent by means of rolling. The metal sheet 44 may be introduced between rollers (48; 50) in order to provide the curvature thereof. This bending may be progressive. Parallel rollers 48 may be in abutment against the metal sheet 44 between the rows of blades 26. Other rollers 50 parallel with the first may abut the metal sheet 44 at the side opposite the blades 26. These other rollers may extend over the entire axial length of the metal sheet, whilst the first rollers 48 may each extend over an axial portion of the metal sheet.

Alternatively, the rollers 50 at the side opposite the blades 26 may each extend over an axial portion of the metal sheet, measured along the rotation axis 14, and/or a direction perpendicular to the rows of blades. The axial length of these rollers 50 may be configured so that they can be interposed 48 between the rollers at the side of the blades. The rollers (48; 50) of the two faces may overlap radially and may be axially offset, in accordance with the face on which they are located.

In this manner, the bending may be configured so as to form internal annular grooves 52, between the rows of blades; and optionally external annular grooves 54 axially in the region of the blades 26. The metal sheet then has a notched profile formed by means of revolution. The thickness of the metal sheet 44 may be less than the radial depth of the grooves, and may be less than the thickness of the wall of the housing.

The rolling may reduce the axial length of the metal sheet 44, where applicable the rows of blades may move towards each other axially. The bending may comprise a roller burnishing step, optionally in order to improve the surface state of the metal sheet, and/or to compress the material in order to limit the appearance and the propagation of cracks.

Figure 10:
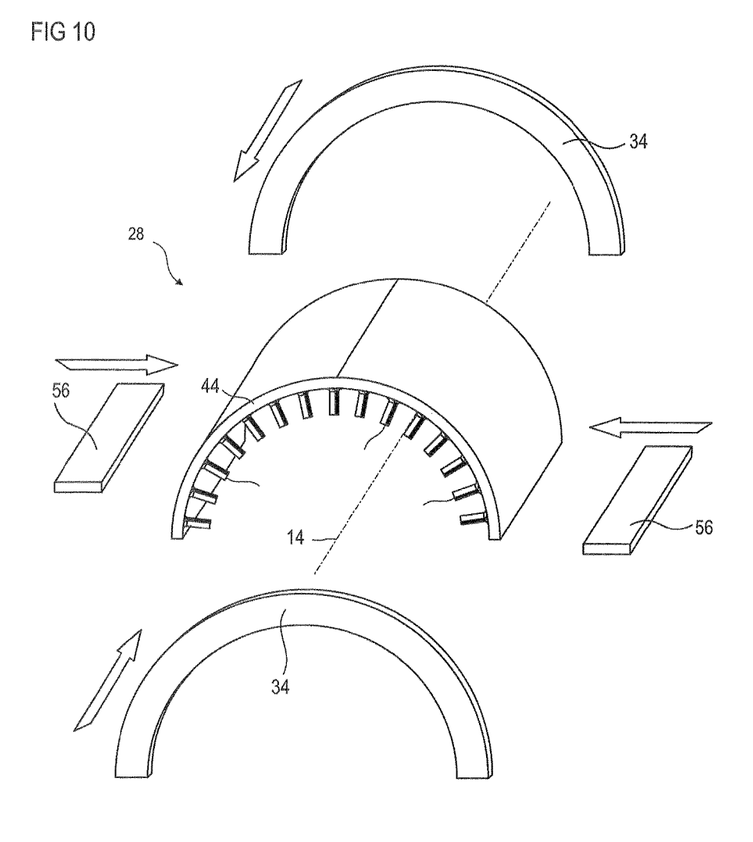
FIG. 10 illustrates the step of welding flanges to the metal sheet according to the present application.

FIG. 10 illustrates the step of welding the flanges to the metal sheet.

The housing may comprise axial flanges 56 which extend radially. The axial flanges 56 may extend over the entire axial length of the metal sheet 44 and enable assembly, optionally of two half-housings. The annular flanges 34 may extend over the entire curve of the associated metal sheet. The flanges (34; 56) may form reinforcements which strengthen the housing with respect to flexion and/or out-of-roundness.

The flanges (34; 56) may be fixed to the bent metal sheet, for example, by means of welding. The flanges may be welded to a convex outer face or to a portion of the metal sheet 44. The flanges may be strips of material which are straight or curved. They may comprise fixing holes (not illustrated). The flanges (34; 56) of the same housing portion may all be welded to each other in order to form a reinforcement frame.

The method may then comprise a step of depositing or applying a layer of abradable material. This layer may be an annular layer and may be arranged between the annular rows of blades (a single row is illustrated) at the inner side. The layer may comprise an elastomer material, a silicone. It is suitable for operating by means of abrasion with the rotor. It may erode in contact with rotor blades.

I claim:

1. Method for producing a housing of an axial turbomachine, the housing comprising a metal sheet and at least one annular row of stator blades, the method comprising the following steps:
   (a) providing a planar metal sheet,
   (b) welding the blades to one of the planar faces of the metal sheet, the blades being arranged so as to form at least one row of the blades,
   (c) bending the metal sheet with the welded blades about a bending axis perpendicular to the at least one row of the blades,
      wherein the bending involves wrapping the blades inside the metal sheet, so as to form the housing with at least one angular tube portion constituted by the metal sheet, and with at least one angular portion of the at least one annular row of the blades,
   wherein the providing the metal sheet comprises a step of machining a rough plate so as to form the planar metal sheet with variations of thickness,
   wherein the machining step comprises a step of production of stumps of the blades, wherein the welding, each of the blades being welded to each of the stumps, the planar metal sheet having a thickness that is less than or equal to the height of the stumps, the each of the stumps and the each of the stator blades having a thickness, the thickness of the each stump being greater than the thickness of the each of the blades.

2. The method according to claim 1, wherein during the welding the blades, the blades are welded by means of friction, in accordance with a movement in the plane of the planar metal sheet.

3. The method according to claim 1, wherein following the bending the metal sheet, the metal sheet forms a tube with the at least one annular row of the blades.

4. The method according to claim 1, wherein the metal sheet forms a half-tube with at least one annular half-row of the blades, the metal sheet has a concave surface and a convex surface, the least one annular half-row of the blades being located on the concave surface.

5. The method according to claim 1, wherein the at least one row of the blades comprises at least two rows of the blades and during the welding the blades, the blades of each of the at least two rows of the blades have parallel chords, the chords of the blades being inclined through an angle relative to the bending axis of the metal sheet which is one of the following less than 30°, less than 20°.

6. The method according to claim 1, wherein during the bending, the bending comprises a plurality of step(s) of rolling and of roller burnishing.

7. Method for producing a housing of an axial turbomachine, the housing comprising a metal sheet and at least one annular row of stator blades, the method comprising the following steps:
   (a) providing a planar metal sheet,
   (b) welding the blades to one of the planar faces of the metal sheet, the blades being arranged so as to form at least one row of the blades,
   (c) bending the metal sheet with the welded blades about a bending axis perpendicular to the at least one annular row of the blades, so as to form the housing with at least one angular tube portion constituted by the metal sheet, and with at least one angular portion of the at least one annular row of the blades,
      the bending is carried out with a plurality of rollers with a rotation axis,
      said rotation axis being perpendicular to the at least one annular row of the blades, wherein rollers of the plurality of rollers located at one side of the metal sheet radially overlap rollers of the plurality of rollers, located at the other side of the metal sheet so as to form internal annular grooves between the at least one annular row of the blades.

8. The method according to claim 7, wherein the welding comprises welding a plurality of rows of the blades and the bending comprises disposing the rollers at the side of the blades in abutment between each row of the blades of the plurality of rows of the blades.

9. The method according to claim 7, wherein the bending is carded out using the rollers which are arranged at one side and the other of the metal sheet, the rollers which are located at one side of the metal sheet being axially spaced apart relative to the rollers which are located at the other side of the metal sheet, so as to allow the radial overlap of the plurality of rollers.

10. The method according to claim 7, wherein at least one annular groove of the internal annular grooves has a depth which is greater than the general thickness of the metal sheet.

11. The method according to claim 7, wherein it further comprises a step (e) of application of at least one annular layer of abradable material in an internal annular groove.

12. The method according to claim 7, wherein the plurality of rollers comprise bearings, at least one bearing being axially disposed at a level of the at least one row of the blades.

* * * * *